3,327,397
SLIDING CALIPER
Giovanni Guido Mangano, Via Rangoni 4,
Brescia, Italy
Filed June 22, 1964, Ser. No. 376,657
1 Claim. (Cl. 33—147)

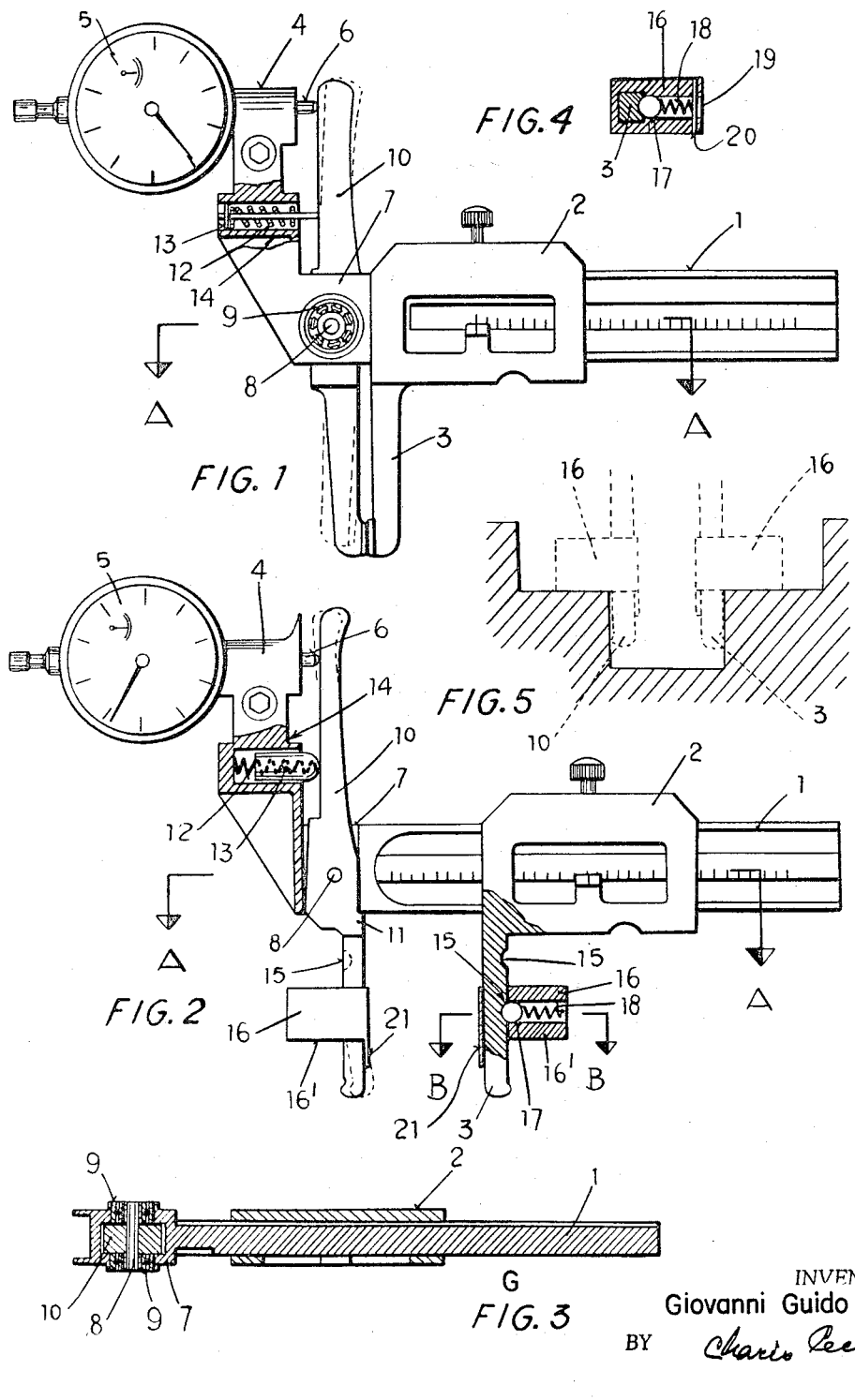

The present invention relates to sliding calipers and, more particularly, to sliding calipers for inside and outside measurements. Most specifically, the present invention is related to a vernier-type sliding caliper for measuring either outer or inner distances with accuracy, characterized in that it comprises a dial gauge or indicator fixedly connected to one extremity of the caliper, a pivoting lever properly hinged on said same extremity and constituting one of the two tips or points of the caliper, and a pair of dolly blocks which are optionally removable and employable preferably for measurements of inner distances.

The device of the present invention will be clearly understood and appreciated from the following detailed embodiment of the invention and from the accompanying drawings, in which:

FIGURE 1 shows one embodiment of the caliper of the invention assembled and ready for measurements of outside distances;

FIGURE 2 shows an embodiment for a similar caliper assembled and ready for measurements of inside distances;

FIGURE 3 is a view of either FIGURE 1 or FIGURE 2 taken along lines A—A;

FIGURE 4 shows a detailed assembly of a dolly block as seen along lines B—B of FIGURE 2; and FIGURE 5 illustrates the method of employing the caliper of the invention for inside measurements.

With reference to the accompanying drawings, the caliper comprises a graduated or calibrated bar 1 with a slider 2. The slider is supplied with a tip or point 3 and is capable of sliding fully to and fro along the bar 1. At one extremity of the bar there is provided a vertical arm 4 on which the dial gauge or indicator 5 is fixed by means of a base or holding element which forms an integral part of said vertical arm 4. From the base of the dial gauge a very sensitive tip 6 protrudes to contact a lever 10.

The lower portion of the vertical arm 4, mentioned hereinabove, and preferably that portion of the vertical arm which is in direct proximity and juxtaposition with the calibrated bar 1 is broader and thicker as it can be seen at 7 in FIGURE 3. On this portion of the vertical arm 4 there is provided a lever 10 pivotable about a pivot 8 which is supported by suitable bearings 9. The lever 10 constitutes the second tip or point of the caliper, the first being, as mentioned above, represented by numeral 3.

The lever 10 of the caliper, when this latter is employed for inside measurements, is supplied with a tappet 11 which acts upon the bar 1 to limit and fix the maximum angular pivoting or deviation of the lever 10. Be it for applications in inside measurements or in outside ones, the vertical arm of the bar 1 comprises intermediate its extremities an actuating spring 12 and relative rod 13, both of which are housed in a cavity 14 preformed in the vertical arm 4 of bar 1.

Due to the action of the spring 12, the lever 10, the upper extremity of which actuates the contact tip 6 of the dial gauge 5, is capable to resume its original and normal position once the measurement of a given workpiece is obtained. The rod 13 which may be variously shaped, such as shown in FIGURE 1 or 2, and has the purpose of returning the lever 10 to its original non-actuating position, shown in dotted lines in FIGURE 1 and in solid lines in FIGURE 2, is necessary in order to retain the sensitivity of contact of the dial-actuating tip or pin 6.

In practice, the caliper is first preset to a value approximating the base measurement of the workpiece. Then, the eventually required fine adjustments are effected by the tip or point of the lever 10, which, moving angularly about pivot 8 on the bearings 9, actuates the tip 6 of the dial gauge 5, which in turn by means of a conventional indicating hand registers the plus or minus corrective values with respect to the base value.

Obviously, the dial gauge must be set to zero when presetting the caliper to the approximate base value of the workpiece. It is, therefore, the tip or point of the lever 10, pivoting substantially on the bar 1 that controls the dial gauge 5 in accordance with the angular measurements caused by the contact of said tip or point upon the surfaces of the workpiece.

Referring now to FIGURES 2 and 5 of the drawings and with reference further to the most preferred applicability of the caliper of the invention to inside measurements, two dolly blocks 16 are mounted on the lower portion of tip 3 of the slider 2 and on the lower portion of the lever 10, in juxtaposition with hemispherical depressions 15 provided in said lower portions. The lower surface 16' of each dolly block is accurately rectified or smoothed and through said surfaces 16' are introduced the tips or points of the caliper. Each dolly block comprises a sphere or ball 17 and a pressure spring 18 housed in cavity 19 and held in position by a pin or peg 20. The ball 17 is furthermore housed in its respective semicircular depression 15. Opposite to ball 17, each dolly block is provided with a guide plate 21 resting against the tip of the caliper, as clearly seen in FIGURE 2.

Thanks to the two dolly blocks 16, mentioned hereinabove, the accurate measurement of the inner distance of a workpiece is readily obtained by leaving or resting the surfaces 16' of the dolly blocks on the horizontal surface available above the distance to be measured (see FIGURE 5), thus assuring the operator of a perfect perpendicularity of the caliper tips with respect to the horizontal surface mentioned hereabove.

What is claimed is:

In a sliding caliper for inside and outside measurement comprising a substantially L-shaped bar having a calibrated longer leg and a generally perpendicular shorter leg extending from one side thereof, a dial indicator fixed to the outer extremity of said shorter leg and having a plunger extending generally parallel to said longer leg, a lever pivoted to said longer leg at a point adjacent said shorter leg, one end of said lever being in a position to actuate said plunger, the other end of said lever extending away from said longer leg to form a first measuring tip, a slider movable along said longer leg and having a second measuring tip extending therefrom in opposed relation to said first measuring tip, the improvement comprising: a plurality of hemispherical depressions along a surface of each of said measuring tips, each of said depressions in said first tip having a corresponding depression in said second tip, the corresponding depressions being at the same distance from the outer ends of their respective tips, and a pair of dolly blocks, each of said dolly blocks having a machined flat surface thereon and a cavity therein extending generally parallel to said machined surface, a sphere in said cavity, a spring in said cavity for biasing said sphere in a direction generally parallel to said machined surface, a guide plate extending perpendicular to said surface and spaced a distance therefrom sufficient to accommodate one of said measuring tips, said guide plate being in opposed relation to said sphere whereby one of said dolly blocks can be mounted on each of the measuring tips with the guide plate bearing against a surface of the tip and the sphere snap-fitted into one if said depressions.

References Cited

UNITED STATES PATENTS

| 454,516 | 6/1891 | Brown. | |
| 1,211,480 | 1/1917 | Newton. | |
| 1,283,868 | 11/1918 | Nefedov | 33—147 |
| 1,510,285 | 9/1924 | Lustenberger | 33—143 |
| 2,440,973 | 5/1948 | Podolan | 33—143 |

FOREIGN PATENTS

| 779,246 | 7/1957 | Great Britain. |

LEONARD FORMAN, *Primary Examiner.*

SAMUEL S. MATTHEWS, *Examiner.*

UNITED STATES PATENT OFFICE

CERTIFICATE OF CORRECTION

Patent No. 3,327,397  June 27, 1967

Giovanni Guido Mangano

It is certified that error appears in the above identified patent and that said Letters Patent are hereby corrected as shown below:

In the heading to the printed specification, between lines 5 and 6, insert -- Claims priority, application Italy, July 19, 1963, 711606 --.

Signed and sealed this 5th day of August 1969.

(SEAL)
Attest:

Edward M. Fletcher, Jr.  WILLIAM E. SCHUYLER, JR.
Attesting Officer  Commissioner of Patents